Jan. 31, 1950 — W. W. CRILEY — 2,496,040
CONTROL VALVE MECHANISM FOR CLUTCHES AND BRAKES
Filed Feb. 15, 1943 — 2 Sheets-Sheet 1
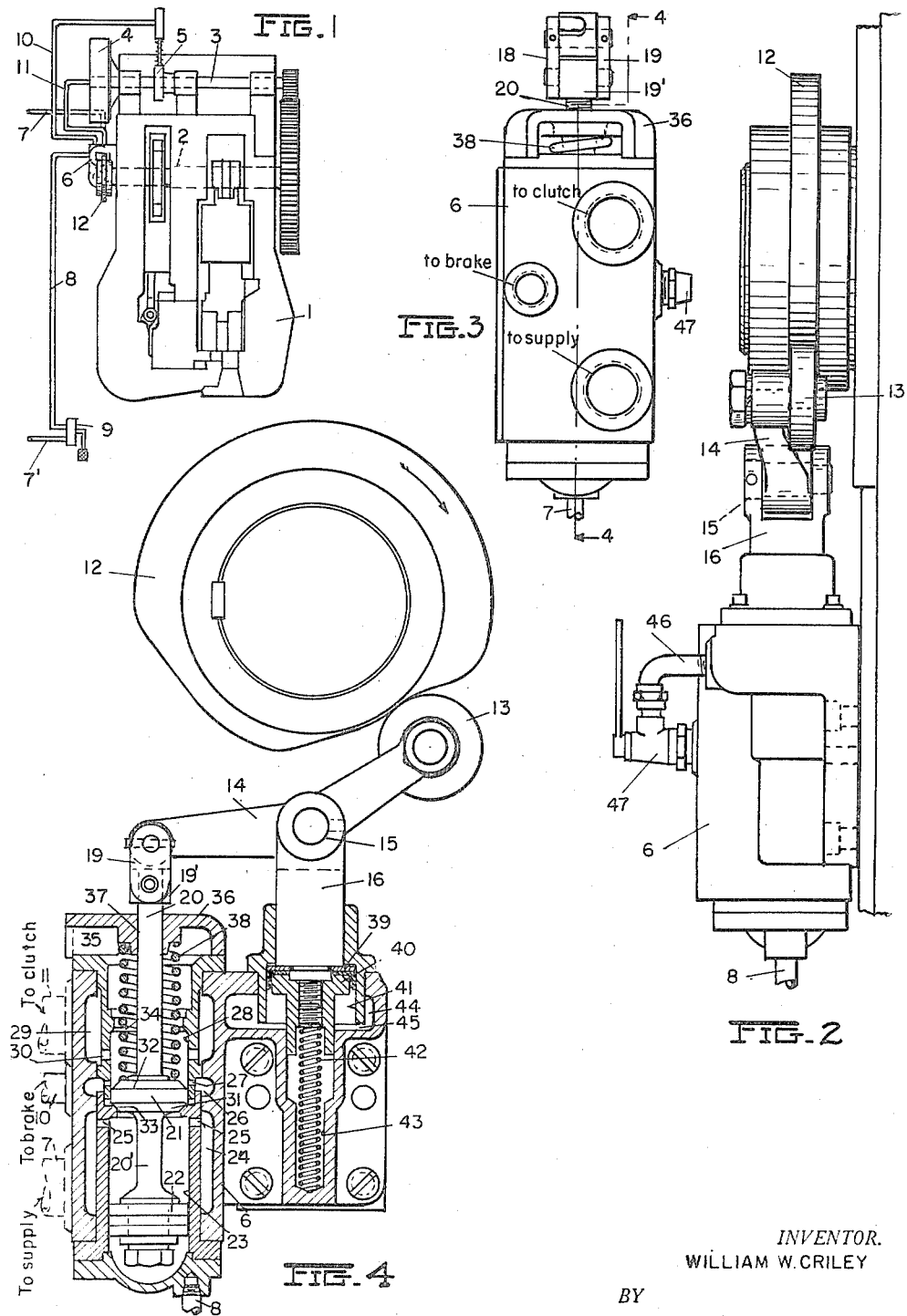
INVENTOR.
WILLIAM W. CRILEY
BY
Oberlin, Limbach & Day
ATTORNEYS

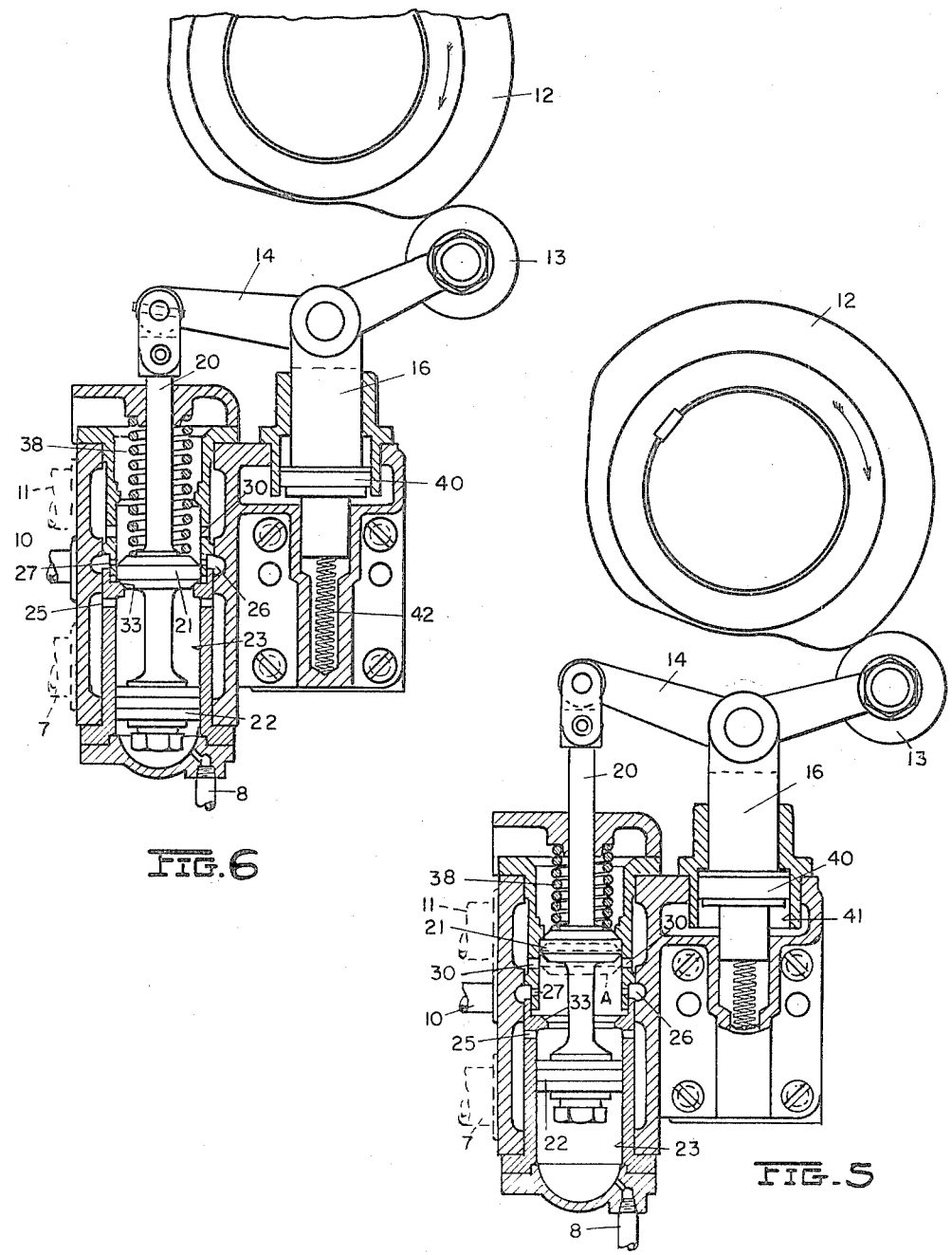

Patented Jan. 31, 1950

2,496,040

UNITED STATES PATENT OFFICE 2,496,040

CONTROL VALVE MECHANISM FOR CLUTCHES AND BRAKES

William W. Criley, Shaker Heights, Ohio, assignor to The Ajax Manufacturing Company, Cleveland, Ohio, a corporation of Ohio Application February 15, 1943, Serial No. 475,903

21 Claims. (Cl. 192—144)

The present invention relates to a control mechanism for operating the application of prime moving power to metal working machines, such as forging machines, presses and the like. In my prior U. S. Patent No. 2,217,332, granted October 8, 1940, and in my U. S. patent application Serial No. 390,092, filed April 24, 1941, now Patent Number 2,357,779, I have disclosed operating control mechanisms wherein the clutch and brake of the metal working machine are operated in timed sequence through the medium of a fluid pressure control valve, such valve being adapted to be initially operated through a manually actuated means, and then operated by machine actuated means during the remainder of the working stroke or cycle of the machine.

The machine actuated means for effecting the operation of the clutch and brake control valve, in metal working machines of the nature to which my above-mentioned U. S. patent and application pertain, is in the form of a cam mounted on a drive shaft of the machine and a cam follower whose motion is transmitted to the control valve proper, to produce an automatic, timed operation of the latter. The control valve, being initially set or tripped by the manually actuated means, such as a foot treadle, is carried through its subsequent positions of the machine operating cycle by the machine actuated means or timer cam and follower, and thus returned to its original starting position, ready for another working cycle of the machine. Briefly, these control valve positions correspond to brake release, clutch engagement, clutch release and brake engagement, sequentially.

Certain variable factors of human and of machine operation, in such control mechanisms, are at times apt to result in undesired machine-operating characteristics. Thus, when the manually operated pressure valve, or foot treadle, employed for initiating the movement of the clutch and brake control valve, is too lightly tripped, there might result a condition wherein full actuating pressure is not introduced to the clutch engaging mechanism, so that the clutch is not fully engaged and the machine is thereby likely to stall when its working parts become subjected to an increased load. Further, there is the possibility that the working parts of the machine will not always stop at the same point when the clutch is released and the brake applied, which is commonly called "coasting by." When the machine coasts by its normal stopping position at the end of a working cycle, it in turn means that the timer cam will be moved beyond its normal stopping point to a subsequent point of revolution where the cam follower will be actuated and the control valve re-set by the timer cam to operating position where the machine will be driven through another unintentional repeat working cycle.

It is, therefore, the general object and nature of my invention to provide a novel and improved control mechanism of the nature above-indicated, wherein the clutch and brake control valve will be opened to full clutch engaging position, irrespective of the lightness or abruptness of operation of the manually actuated pressure valve or foot treadle, thus preventing subsequent stalling of the machine; and also to provide means for preventing the re-tripping or re-opening of the clutch and brake control valve by the "coasting by" of the machine parts at the end of the working cycle.

Another object of my invention is to provide a clutch and brake control valve having a greatly increased life and lowered maintenance requirements. Heretofore, fluid pressure control valves have been employed in control mechanisms for forging machines and the like, which valves have been of the sliding piston, hollow sleeve or piston, and dual stem types, requiring very accurate machine fitting and assembly, and pressure packing joints, all of which require careful maintenance and replacement during the life of operation of the machine, as well as time-consuming and expensive manufacturing operations for initial assembly. I have overcome these disadvantages by adapting the poppet type of valve to a clutch and brake control valve, and wherein the initial cost and difficulty of manufacturing is substantially eliminated, and the positive sealing action of the poppet valve upon its seat is utilized not only to produce a clean-cut and reliable valve action, but also to do away with pressure packings, glands and the like, which are more readily subject to wear and replacement.

Additional objects and advantages of my invention shall become apparent as the following description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is an elevational view of a forging machine illustrating the control mechanism of the present invention as assembled thereon;

Fig. 2 is a plan view of the valve control mechanism;

Fig. 3 is a plan view of the control valve body and taken from a side opposite to that of Fig. 2;

Fig. 4 is a sectional view of the control valve mechanism, the section being taken substantially along line 4—4 of Fig. 3; and Figs. 5 and 6 are sectional views similar to Fig. 4, but showing the operating parts in different relative positions, and illustrating certain functional operations of the control valve mechanism.

Now referring particularly to Fig. 1 of the drawing, there is shown therein a forging machine having a base 1 with a main drive shaft 2 and a high speed drive shaft 3 connected thereto. A fluid actuated clutch 4 and a brake 5 are mounted on the shaft 3. The control valve body 6 is mounted on the side of the machine and is for controlling the flow of fluid pressure from the main pressure supply line 7 to the clutch 4 and brake 5. A pressure line 8 leads from the valve body 6 to the manually actuated valve or foot treadle 9, which is also connected through the line 7' to the pressure supply source. The pressure line 10 connects the valve body 6 to the pressure actuated cylinder of the brake 5 and the line 11 connects the valve body 6 to the fluid actuated clutch 4.

A cam 12 is carried by the operating end of the shaft 2 and is adapted to be contacted by the roller 13 on one end of the bell crank lever 14 which is pivotally carried at 15 on the outer end of the piston rod or plunger 16.

The other, or left-hand end of the lever 14 is pivotally linked through the parallel connecting links 18 and 19, and through the medium of the adjustable trunnion nut 19', to the stem 20 of the poppet valve 21.

The poppet valve 21 is mounted within the cylindrical interior of the valve body 6. The stem 20 of the poppet valve 21 projects beyond the head of the valve, as indicated by the portion 20' and carries a piston thereon which is adapted to reciprocate in the cylinder 23 in the lower portion of the interior of the valve body 6. The pressure line 8 from the foot treadle 9 is connected to the head end of the cylinder 23. The pressure line 7 leads into a manifold 24 surrounding the cylinder 23; the manifold 24 being in communication with the cylinder 23 through a plurality of inlet ports 25. The pressure line 10 is connected to the manifold 26 in the valve body 6, which manifold in turn communicates through the ports 27 with the cylinder 28 in which the poppet valve 21 is adapted to reciprocate. The clutch pressure line 11 communicates with the manifold 29 having the inlet ports 30, the ports 30 also communicating with the interior of the cylinder 28. The poppet valve 21 has seating faces 31 and 32 on its opposite sides. The face 31 is adapted to seat upon the valve seat 33 located between the main pressure line ports 25 and the brake pressure line ports 27. The valve face 32 is adapted to seat upon the valve seat 34 located above the clutch pressure line ports 30.

The cylinder 28, in the valve body 6, terminates in the exhaust passage 35 leading to the atmosphere. The passage 35 is formed by a cap 36 on the top of the valve body, which also has a drilled boss 37 forming a guide for the valve stem 20.

A coiled compression spring 38 is mounted between a shoulder on the boss 37 and the head of the poppet valve 21, tending to urge the latter in a downward direction and against the seat 33.

The piston rod 16 is carried by a piston 40 in the cylinder 41. The upper end of the cylinder 41 has a stop shoulder 39 adapted to limit the upward movement of the piston 40. A compression spring 42 is mounted in the receiving well 43 and against the underside of the piston 40, tending to urge the latter in an upward direction. The spring 42 is made of such "weight," or exerts sufficient pressure, to counter-balance the weight of the piston rod 16, roller 13 and lever 14, but not so great that these latter parts cannot be moved downwardly against the spring under slight pressure.

A chamber 44 surrounds the cylinder 41 and is in communication therewith through the space 45. A pressure line 46 leads from the chamber 44 to the shut-off valve 47 which is in turn connected to the brake pressure manifold 26.

The operation of the above-described control valve mechanism is as follows:

When the foot treadle 9 is actuated, pressure is introduced through the line 8 to the head end of the cylinder 23, forcing the piston 22 and poppet valve 21 in an upward direction. As the poppet valve 21 leaves the seat 33 and its cylindrical head portion passes the ports 27, pressure from the line 7 and ports 25 is introduced to the manifold 26 and thence through the line 10 to release the brake 5. As the poppet valve 21 next clears the ports, pressure is likewise introduced through such ports to the manifold 29 to the line 11 to engage the clutch 4.

Simultaneously pressure is led from the manifold 26 to the chamber 44 to the cylinder 41, forcing and holding the piston 40 in its upper position, as shown in Fig. 4. The brake 5 being released and the clutch 4 being engaged, the cam 12 on the end of the shaft 21 commences to rotate in a clock-wise direction as indicated by the arrow in Fig. 4, causing the roller 13 to move up upon the rise of the cam, pivoting the lever 14 in a clockwise direction, and drawing the poppet valve 21 against the pressure of the spring 38 up to the seat 34.

The machine is now started upon its working cycle. The foot treadle is released, and the contact of the roller 13 upon the cam 12 determines the subsequent movement of the poppet valve 21, so that as the roller 13 drops down from succeeding rises on the cam 12, the poppet valve 21 leaves its seat 34, moves downwardly past the ports 30 opening the clutch pressure line 11 to exhaust out through the cylinder 28 and exhaust passage 35; and subsequently past the ports 27 and to seating position upon its seat 33. In the latter position, the brake pressure line 10 is also opened to exhaust, and the main supply line pressure 7 is shut off to the cylinder 28 by reason of the spring 38 holding the poppet valve securely down against this seat.

In the event that the foot treadle 9 is too lightly depressed or tripped, so that the poppet valve 21 is not forced all the way up in the cylinder 28 and against its seat 34, the piston 40 and piston rod 16 so operate upon the lever arm 14 as to insure the full and complete movement of the poppet valve 21 and correspondingly, the complete engagement of the clutch 4. This operation is illustrated in Fig. 5, wherein the poppet valve 21, as shown by the dotted line position A, has just slightly opened the ports 30, so that they are in effect throttled and full line pressure cannot be introduced to the clutch 4. In such an instance, if the machine should then start upon its stroke, and upon reaching an increased working load, it would be likely to stall due to slipping of the clutch. However, once the poppet valve opens the ports 27, the main pressure goes from the manifold 26, through the valve 47, the line 46 to the cylinder 41 to force the piston 40 and its rod 16 upwardly, thus simultaneously pushing the poppet valve 21 up against its seat 34 and fully clearing the clutch line ports 30. Thus, once the machine is started and the roller 13 climbs up upon the rise of the cam 12, the introduction of pressure to the cylinder 41 and the upwardly exerted force on the piston 40 makes sure that the poppet valve 21 is carried home to the full length of its stroke and against the seat 34, even though the initial tripping pressure introduced from the foot treadle 9 to the cylinder 23 might have been insufficient to do so.

In the event that the machine, at the end of its working cycle, coasts by its normal stopping point, so that the cam 12 tends to actuate the lever 14, any unintentional re-tripping of the clutch and brake control valve is prevented by the mode of operation as illustrated in Fig. 6. As the roller 13 reaches the low spot of the cam 12, as shown in Fig. 4, the poppet valve 21 is returned to its seat 33 and pressure is likewise exhausted from the cylinder 41, back through the line 46, the valve 47, manifold 26, ports 27 to exhaust passage 35. This corresponds to the normal end of the working cycle of the machine. As heretofore noted, the pressure of spring 42 is just enough to overcome the weight of the piston 40, piston rod 16, lever 14 and roller 13. Then, in the event that the machine coasts by its normal stopping position, so that cam 12 depresses roller 13 and arm 14, as shown in Fig. 6, piston rod 16 and piston 40 will merely be depressed down against spring 42, leaving the poppet valve 21 undisturbed upon its seat 33, so that no pressure is introduced from the main pressure line 7 to the clutch and brake lines 10 and 11.

However, it will also be seen that even if the machine does coast by and that it is then the intention of the operator to re-trip the treadle 9 and start the machine on a new working cycle, the valve parts, as shown in Fig. 6, will then be returned to their normal operating positions as illustrated in the solid lines in Fig. 5.

In the event that it is desired to perform "inching" operations upon the machine, viz., to render the machine actuated control part of the mechanism inoperative, so that the cam 12 will be of no effect, the valve 47 is simply closed. This permits the poppet valve 21 to be operated by the foot treadle 9 at any point throughout the working stroke of the machine, for short inching movements of the latter, because the piston 40, having no fluid pressure exerted thereon, will not exert any tripping force on the stem 20 of the poppet valve 21.

It will be noted, from the above description of the alternative modes of operation of my control valve mechanism, that the poppet valve 21 is forcefully pressed against its alternative seats 33 and 34, during all conditions of operation. When seated against the lowermost seat 33, the pressure of the spring 38 and the downward pressure of the air on piston 22 operate to effect a firm and secure seat; and when pressed against the seat 34, the fluid pressure exerted through the piston 40 operates to produce a similar result. It should be noted that this last-mentioned pressure-seating of the valve face 32 against the seat 34 is assured by so adjusting the trunnion nut 20' that the piston 40 is pushed downwardly a slight distance from the shoulder 39 when the roller 13 is on the low spot of the cam 12.

It will thus be seen that my above-described adaptation of the poppet valve provides a secure and positive valving action and tight closure in both the "on" and "off" positions without requiring pressure packing rings or sealing glands with snug fits passing over ports or openings, or around valve stems; and finally, lends itself to quite simple and inexpensive manufacturing operations.

Other modes of applying the principle of the invention may be employed, change being made as regards the details described, provided the features stated in any of the following claims or the equivalent of such be employed.

I therefore particularly point out and distinctly claim as my invention:

1. The combination with a machine having a fluid actuated clutch and brake in its driving train, with valve means for controlling operation of the clutch and brake actuating elements, and both manually actuated fluid power means and machine actuated mechanical means for operating said valve means; of fluid actuated means controlled by the operation of said valve means for determining the transmission of operating movement of said machine actuated means to said valve means.

2. The combination with a machine having a fluid actuated clutch and brake in its driving train, with valve means for controlling operation of the clutch and brake actuating elements, and both manually actuated fluid power means and machine actuated mechanical means for operating said valve means; of motion transmitting means associated with said machine actuated means for imparting operating movement of the latter to said valve means; and fluid actuated means connected to said motion transmitting means and controlled by the operation of said valve means for rendering said motion transmitting means operative.

3. The combination with a machine having a fluid actuated clutch and brake in its driving train, with valve means for controlling operation of the clutch and brake actuating element, and both manually actuated fluid power means and machine actuated mechanical means for operating said valve means; of fluid actuated means for determining the transmission of operating movement of said machine actuated means to said valve means, and a fluid pressure condition from said valve means to said last-named fluid actuated means whereby the latter is actuated in unison with said valve means.

4. The combination with a machine having a fluid actuated clutch and brake in its driving train, with valve means for controlling operation of the clutch and brake actuating elements, and both manually actuated fluid power means and machine actuated mechanical means for operating said valve means; of motion transmitting means associated with said machine actuating means for imparting operating movement of the latter to said valve means, fluid actuated means connected to said motion transmitting means for rendering the latter operative, and a fluid pressure connection from said valve means to said last-named fluid actuated means whereby the latter is actuated in unison with said valve means.

5. The combination with a machine having a fluid actuated clutch and brake in its driving train, with valve means for operating the clutch and brake elements, and manually actuated means for operating said valve means in one direction; of a cam driven by said machine, a lever arm follower connecting said cam to said valve means for operating the latter in the other direction, and a fluid pressure cylinder having a piston connected to said lever arm follower and adapted to urge the latter into contact with said cam.

6. The combination with a machine having a fluid actuated clutch and brake in its driving train, with valve means for operating the clutch and brake elements, and manually actuated means for operating said valve means in one direction; of a cam driven by said machine, a lever arm follower connecting said cam to said valve means for operating the latter in the other direction, a fluid pressure cylinder having a piston connected to said lever arm follower and adapted to urge the latter into contact with said cam, and a fluid pressure connection from said valve means to said cylinder whereby said piston is actuated in unison with said valve means.

7. The combination with a machine having a fluid actuated clutch and brake in its driving train, with valve means for operating the clutch and brake elements, and manually actuated means for operating said valve means in one direction; of a cam driven by said machine, a lever arm follower connecting said cam to said valve means for operating the latter in the other direction, and a fluid pressure cylinder having a piston supporting the fulcrum of said rocker arm follower and adapted to move said fulcrum in a direction corresponding with the direction of contacting movement of said follower with said cam.

8. The combination with a machine having a fluid actuated clutch and brake in its driving train, with valve means for operating the clutch and brake elements, and manually actuated means for operating said valve means in one direction; of a cam driven by said machine, a lever arm follower connecting said cam to said valve means for operating the latter in the other direction, a fluid pressure cylinder having a piston supporting the fulcrum of said rocker arm follower and adapted to move said fulcrum in a direction corresponding with the direction of contacting movement of said follower with said cam, and a fluid pressure connection from said valve means to said cylinder whereby said piston is actuated in unison with said valve means.

9. In a control mechanism for a metal working machine having fluid pressure clutch and brake actuating elements, such control mechanism comprising a single source of fluid pressure, and pressure conduits communicating with said clutch and brake elements, respectively, the improvement comprising a valve body having said pressure source and said pressure conduits connected to its interior, a poppet valve movable within said valve body, operating stems on the opposite ends respectively of said poppet valve projecting to the exterior of said valve body, a head on said poppet valve having a pair of opposed seating faces, one seat for said poppet valve located in said valve body between the point of communication of said pressure source and the points of connection of said pressure conduits and in surrounding spaced relation to one stem, and a second seat for said poppet valve in said valve body located at a point spaced from said one seat and beyond said points of connection of said pressure conduits and in surrounding spaced relation to the other stem, whereby lifting of said poppet valve from said one seat places said pressure source in communication with said body around said one stem and seating of said poppet valve on said seat seals the interior of said valve body adjacent said other stem.

10. In a control mechanism for a metal working machine having fluid pressure clutch and brake actuating elements, such control mechanism comprising a single source of fluid pressure, and pressure conduits communicating with said clutch and brake elements, respectively, the improvement comprising a valve body having said pressure source and said pressure conduits connected to its interior each in spaced relation to the others longitudinally of the body, a poppet valve movable longitudinally within said valve body, a stem on said poppet valve projecting to the exterior of said valve body, a head on said poppet valve having a pair of opposed seating faces, a pressure exhaust opening in said valve body communicating with the interior thereof, one seat for said poppet valve located in said valve body between the point of communication of said pressure source and both of the points of connection of said pressure conduits, and a second seat for said poppet valve in said valve body located at a point spaced from said one seat and between said points of communication of said pressure conduits and said exhaust opening, and said valve having a portion engaging the interior wall of the body and disposed between said first seat and said points of communication of the pressure conduits and preventing communication of said source and conduits, and said valve being movable in a direction away from said first seat a distance to dispose said portion beyond said points of connection of the pressure conduits, whereby lifting of said poppet valve from said one seat a predetermined distance places said pressure source in communication with said pressure conduits and seating of said poppet valve on said second seat closes said exhaust opening to the interior of said valve body.

11. In a control mechanism for a metal working machine having fluid pressure clutch and brake actuating elements, such control mechanism comprising a single source of fluid pressure, and pressure conduits communicating with each of said clutch and brake elements, respectively, the improvement comprising a valve body having said pressure source and said pressure conduits connected to its interior, a poppet valve movable within said valve body, a stem on said poppet valve projecting to the exterior of said valve body, a head on said poppet valve having a pair of opposed seating faces, one seat for said poppet valve located in said valve body between the point of communication of said pressure source and the points of connection of said pressure conduits, a second seat for said poppet valve in said valve body located at a point spaced from said one seat and beyond said points of connection of said pressure conduits, whereby lifting of said poppet valve from said one seat places said pressure source in communication with said pressure conduits and seating of said poppet valve on said second seat seals the interior of said valve body adjacent said stem, manually actuated means and machine actuated means for determining the prime movement of said poppet valve in both directions between said one seat and said second seat, and yieldable means connected to said poppet valve operating in aid of such prime movement in both directions.

12. In a control mechanism for a metal working machine having fluid pressure clutch and brake actuating elements, such control mechanism comprising a single source of fluid pressure, and pressure conduits communicating with each of said clutch and brake elements, respectively, the improvement comprising a valve body having said pressure source and said pressure conduits connected to its interior, a poppet valve movable within said valve body, a stem on said poppet valve projecting to the exterior of said valve body, a head on said poppet valve having a pair of opposed seating faces, a pressure exhaust opening in said valve body communicating with the interior thereof adjacent said stem, one seat for said poppet valve located in said valve body between the point of communication of said pressure source and the points of connection of said pressure conduits, a second seat for said poppet valve in said valve body located at a point spaced from said one seat and between said points of communication of said pressure conduits and said exhaust opening, whereby lifting of said poppet valve from said one seat places said pressure source in communication with said pressure conduits and seating of said poppet valve on said second seat closes said exhaust opening to the interior of said valve body, manually actuated means and machine actuated means for determining the prime movement of said poppet valve in both directions between said one seat and said second seat, and yieldable means connected to said poppet valve operating in aid of such prime movement in both directions.

13. In a control mechanism for a metal working machine having fluid pressure clutch and brake actuating elements, such control mechanism comprising a single source of fluid pressure, and pressure conduits communicating with each of said clutch and brake elements, respectively, the improvement comprising a valve body having said pressure source and said pressure conduits connected to its interior, a poppet valve movable within said valve body, a stem on said poppet valve projecting to the exterior of said valve body, a head on said poppet valve having a pair of opposed seating faces, one seat for said poppet valve located in said valve body between the point of communication of said pressure source and the points of connection of said pressure conduits, a second seat for said poppet valve in said valve body located at a point spaced from said one seat and beyond said points of connection of said pressure conduits, whereby lifting of said poppet valve from said one seat places said pressure source in communication with said pressure conduits and seating of said poppet valve on said second seat seals the interior of said valve body adjacent said stem, manually actuated fluid pressure means and machine actuated means for determining the prime movement of said poppet valve in both directions between said one seat and said second seat, spring means for urging said poppet valve into seating position on said one seat, and a second fluid pressure means connected to said poppet valve for urging it into seating position on said second seat.

14. In a control mechanism for a metal working machine having fluid pressure clutch and brake actuating elements, such control mechanism comprising a single source of fluid pressure, and pressure conduits communicating with each of said clutch and brake elements, respectively, the improvement comprising a valve body having said pressure source and said pressure conduits connected to its interior, a poppet valve movable within said valve body, a stem on said poppet valve projecting to the exterior of said valve body, a head on said poppet valve having a pair of opposed seating faces, a pressure exhaust opening in said valve body communicating with the interior thereof adjacent said stem, one seat for said poppet valve located in said valve body between the point of communication of said pressure source and the points of connection of said pressure conduits, a second seat for said poppet valve in said valve body located at a point spaced from said one seat and between said points of communication of said pressure conduits and said exhaust opening, whereby lifting of said poppet valve from said one seat places said pressure source in communication with said pressure conduits and seating of said poppet valve on said second seat closes said exhaust opening to the interior of said valve body, manually actuated fluid pressure means and machine actuated means for determining the prime movement of said poppet valve in both directions between said one seat and said second seat, spring means for urging said poppet valve into seating position on said one seat, and a second fluid pressure means connected to said poppet valve for urging it into seating position on said second seat.

15. The combination with a machine having a clutch and brake in its driving train, movable means for actuating the brake and clutch elements, manually actuated means for initially operating the movable means, a cam driven by said machine, a lever arm follower having a fulcrum for connecting the cam to said movable means for operating the latter after said initial operation; of additional means movably supporting the fulcrum and adapted to move the fulcrum in a direction corresponding with the direction of contacting movement of the follower with the cam and means operatively connecting the movable means and said additional means for actuating the additional means in unison with the movable means.

16. The combination with a control device including a member movable from a starting position to a control position, means for moving the member from starting position to said control position, means for returning the member to starting position, additional means adapted for operative connection to a machine to be controlled and operable thereby when so connected, after the member has been moved to said control position, to move the member through a control cycle; of means normally rendering the additional means inoperative to move the member while the member is being moved from starting position initially toward said control position and rendered operative upon additional movement of the member further from starting position to render the additional means operative to move the member fully into the control position.

17. In a control valve mechanism, the combination of a movable valve member, a cam and follower for moving said valve member in one direction, a fluid pressure cylinder and piston for moving said valve in the same direction, a spring for urging said valve member in a direction opposite to said cam and follower, and a second fluid pressure cylinder and piston connected to said follower for maintaining the latter in operative engagement with said cam, said second cylinder and piston exerting a greater pressure through said follower on said valve member than the pressure exerted thereon by said spring.

18. In a control valve mechanism, the combination of a movable valve member, a cam and follower for moving said valve member in one direction, a fluid pressure cylinder and piston for moving said valve in the same direction, a spring for urging said valve member in a direction opposite to said cam and follower, and a second fluid pressure cylinder and piston actuated by pressure released by movement of said valve member in said first direction, said second piston being connected to said follower for maintaining the latter in operative engagement with said cam, said second cylinder and piston exerting a greater pressure through said follower on said valve member than the pressure exerted thereon by said spring.

19. The combination with a machine having a clutch and brake in its driving train, a movable control member adapted to control operation of the clutch and brake operating elements, and both manually actuated means and machine actuated means operative to move said control member; of fluid pressure means adapted to be actuated by manually initiated movement of said control member to bring said control member and machine actuated means into operative relationship whereby further movement of said control member will now be mechanically and positively assured.

20. In a control mechanism for a metal working machine having fluid pressure clutch and brake actuating elements, such control mechanism comprising a single source of fluid pressure, and pressure conduits communicating with said clutch and brake elements, respectively, the improvement comprising a valve body having said pressure source and said pressure conduits connected to its interior, a poppet valve movable within said valve body, a seat for said poppet valve in said valve body located between the point of connection of said pressure source and the points of connection of said pressure conduits; whereby lifting of said poppet valve from said seat places said pressure source in communication with one or more of said pressure conduits depending on the degree of lift, manually controlled means for lifting said valve, machine actuated means adapted to determine and control the degree of lifting movement of said poppet valve from said seat but normally inoperative to perform such function, spring means urging said poppet valve to seating position against the action of said machine actuated means, and fluid pressure means actuated in response to only partial lifting of said valve by said manually controlled lifting means operative to move and hold said machine actuated means in fully operative position thus to control said valve.

21. In a control valve mechanism the combination of a movable valve member, a cam, a follower for said cam connected with said valve member operative to move said valve member in one direction, resilient means for moving said valve member in the opposite direction, fluid pressure actuated means connected with said follower adapted but normally inoperative to hold said follower in such operative relationship to said cam, and means connected with said valve adapted to admit fluid pressure to said fluid pressure actuated means to render the latter thus operative in response to a predetermined initial movement of said valve member.

WILLIAM W. CRILEY.

REFERENCES CITED

The following references are of record in the file of this patent:

UNITED STATES PATENTS

| Number | Name | Date |
|---|---|---|
| 1,696,866 | Seaman | Dec. 25, 1928 |
| 1,697,952 | French | Jan. 8, 1929 |
| 2,098,115 | Voorhies | Nov. 2, 1937 |
| 2,192,734 | Clouse | Mar. 5, 1940 |
| 2,206,957 | Hose | July 9, 1940 |
| 2,210,227 | Williamson | Aug. 6, 1940 |
| 2,217,332 | Criley | Oct. 8, 1940 |
| 2,250,629 | Friedman | July 29, 1941 |

Certificate of Correction

Patent No. 2,496,040                                                                 January 31, 1950

WILLIAM W. CRILEY

It is hereby certified that errors appear in the printed specification of the above numbered patent requiring correction as follows:

Column 6, line 53, for the word "element" read *elements*; line 59, for "condition" read *connection*; column 8, line 8, before "seat" insert *second*; and that the said Letters Patent should be read with these corrections therein that the same may conform to the record of the case in the Patent Office.

Signed and sealed this 9th day of May, A. D. 1950.

[SEAL]

THOMAS F. MURPHY,
*Assistant Commissioner of Patents.*